March 30, 1948. W. J. MILLER 2,438,514
METHOD AND APPARATUS FOR DECORATING POTTERY WARE
Filed Aug. 21, 1941 7 Sheets-Sheet 1

INVENTOR.
WILLIAM J. MILLER
BY
ATTORNEYS.

March 30, 1948.   W. J. MILLER   2,438,514
METHOD AND APPARATUS FOR DECORATING POTTERY WARE
Filed Aug. 21, 1941   7 Sheets-Sheet 2

INVENTOR.
WILLIAM J. MILLER
BY
ATTORNEY.

March 30, 1948. W. J. MILLER 2,438,514
METHOD AND APPARATUS FOR DECORATING POTTERY WARE
Filed Aug. 21, 1941 7 Sheets-Sheet 3
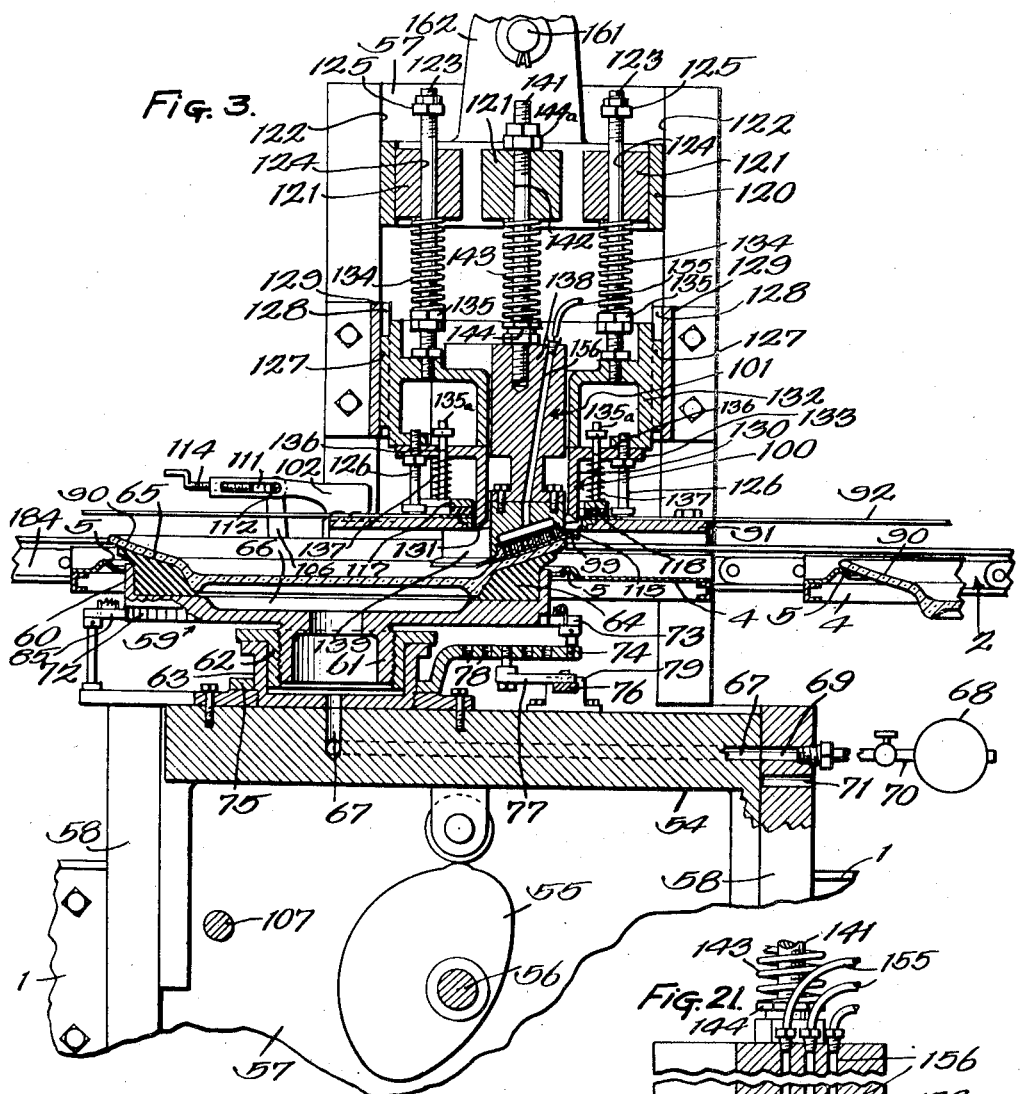
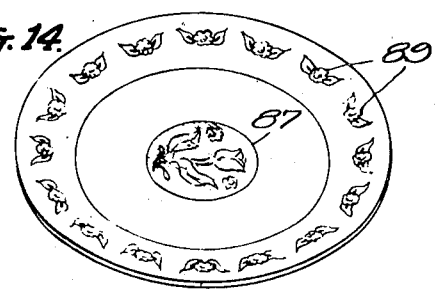
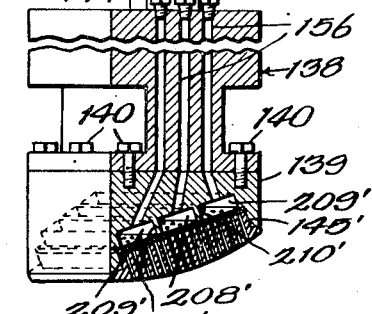
INVENTOR.
WILLIAM J. MILLER
BY
ATTORNEY.

March 30, 1948.  W. J. MILLER  2,438,514
METHOD AND APPARATUS FOR DECORATING POTTERY WARE
Filed Aug. 21, 1941   7 Sheets-Sheet 4
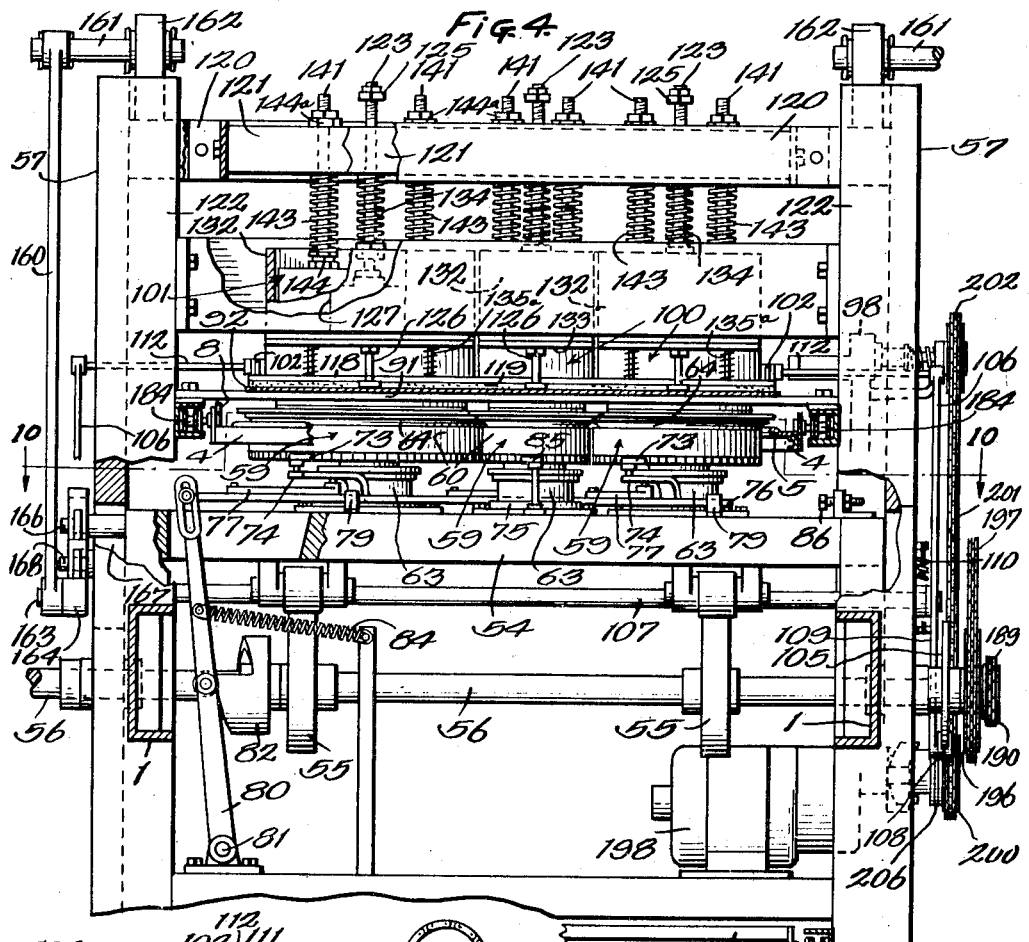
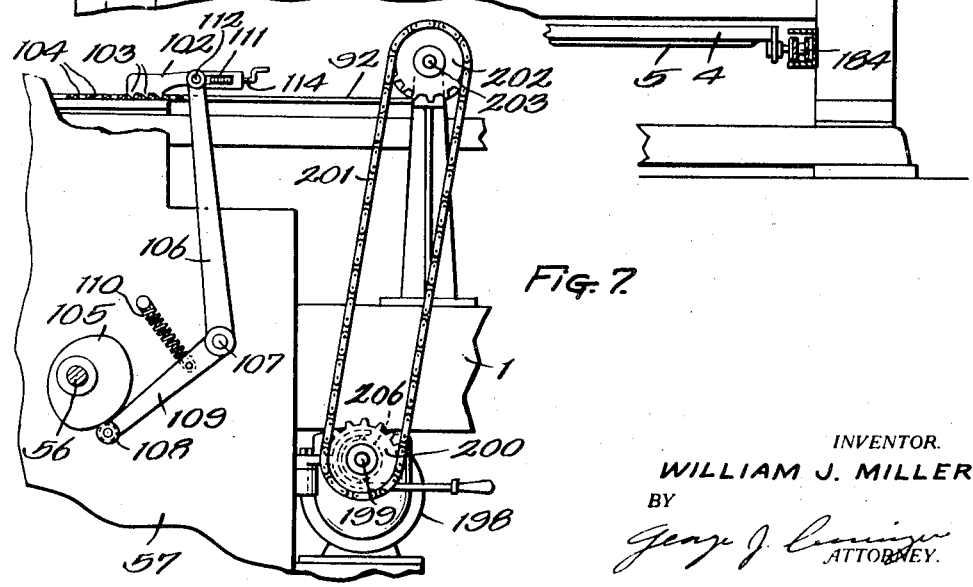
INVENTOR.
WILLIAM J. MILLER
BY
*George J. *
ATTORNEY.

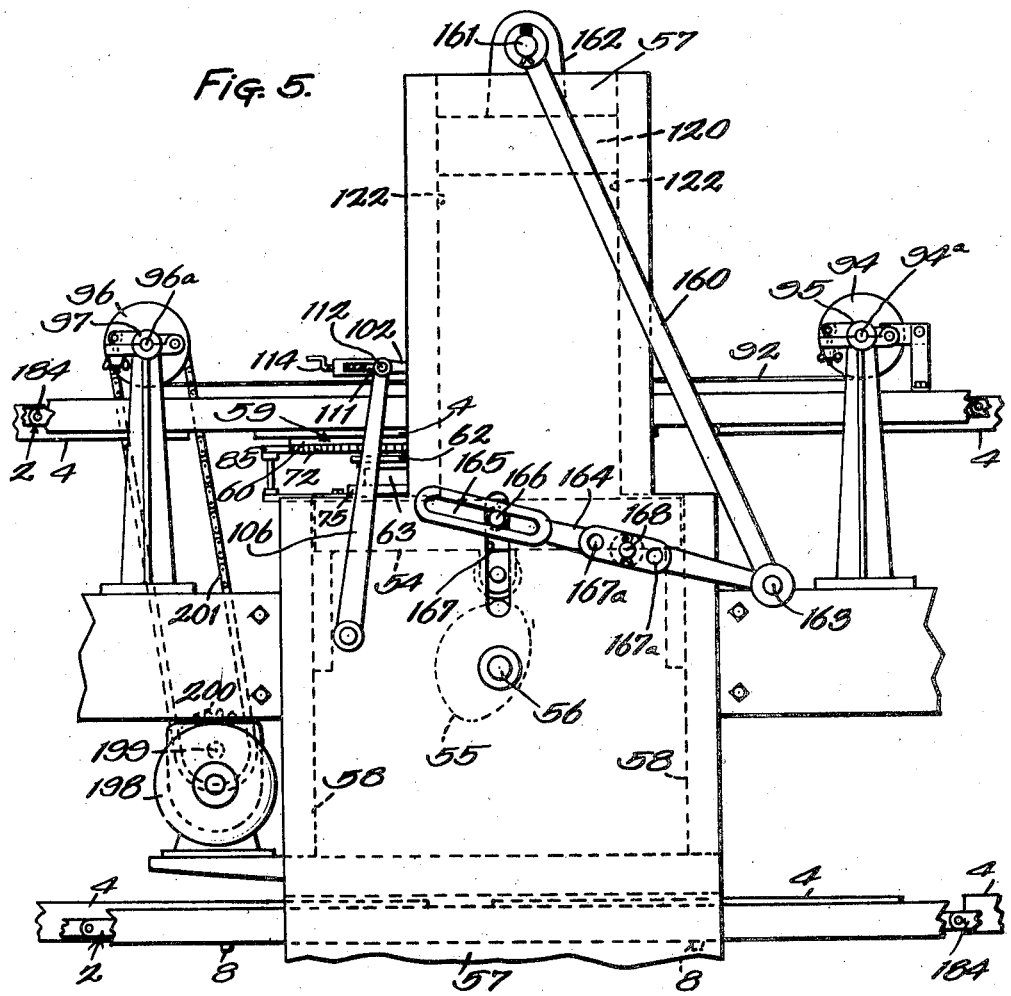

March 30, 1948. W. J. MILLER 2,438,514
METHOD AND APPARATUS FOR DECORATING POTTERY WARE
Filed Aug. 21, 1941 7 Sheets-Sheet 6
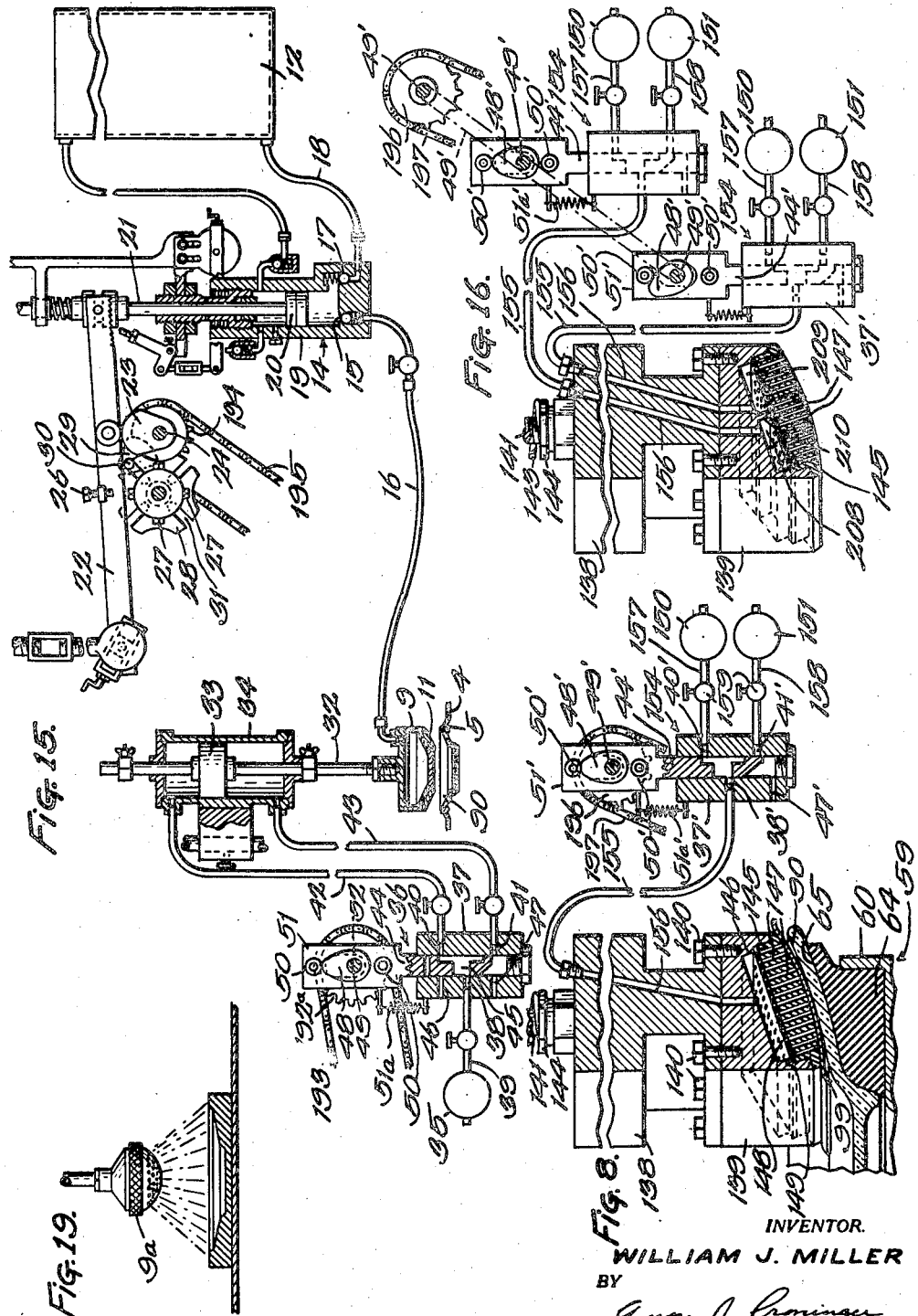
INVENTOR.
WILLIAM J. MILLER
BY
*George J. Croninger*
ATTORNEY.

March 30, 1948. W. J. MILLER 2,438,514
METHOD AND APPARATUS FOR DECORATING POTTERY WARE
Filed Aug. 21, 1941 7 Sheets-Sheet 7
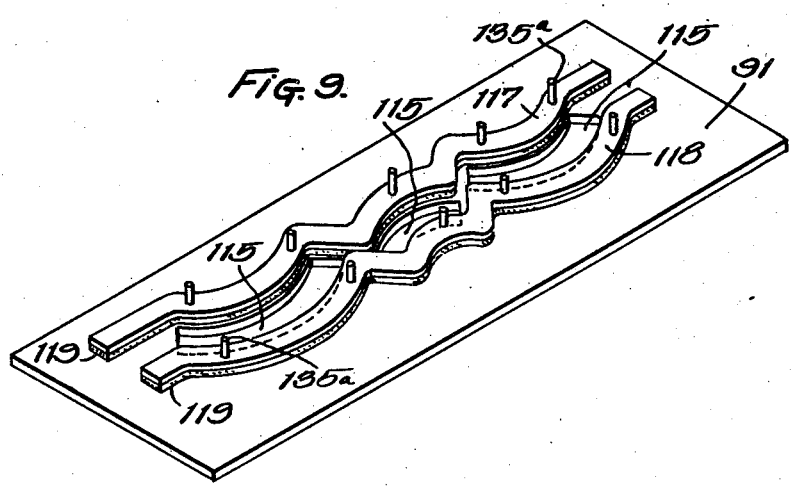
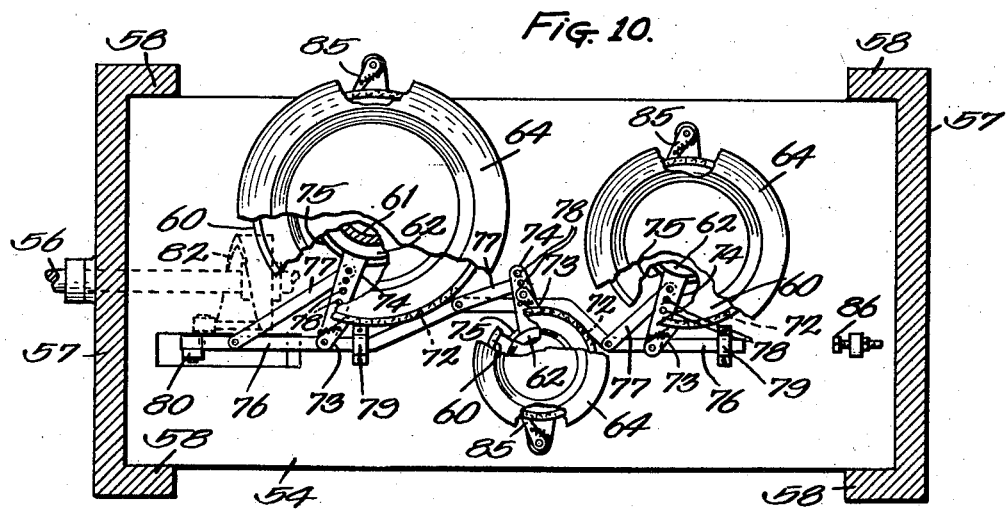
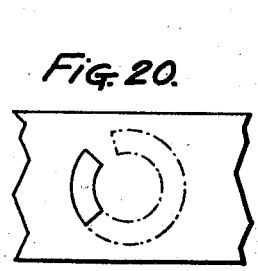
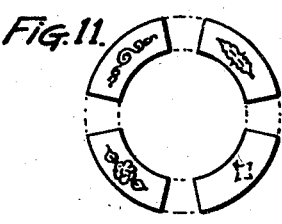
INVENTOR.
WILLIAM J. MILLER
BY
ATTORNEY.

Patented Mar. 30, 1948

2,438,514

UNITED STATES PATENT OFFICE 2,438,514

METHOD AND APPARATUS FOR DECORATING POTTERY WARE

William J. Miller, Swissvale, Pa., assignor to Miller Pottery Engineering Company, Swissvale, Pa., a corporation of Pennsylvania Application August 21, 1941, Serial No. 407,733

19 Claims. (Cl. 41—1)

This invention relates to methods and apparatus for decorating pottery ware. It has to do with applying decalcomania and the like to pottery ware, particularly table ware, such as, plates, cups and saucers and other forms of hollow ware or flat ware.

It has been customary to apply decalcomania by hand, the transfers being first cut out of large sheets of paper on which the designs were originally printed. In the case of border decorations, these transfers were applied segmentally to the previously sized ware and fitted together by hand. The pigment was smoothed out and affixed to the ware by brushing and the paper backing subsequently soaked off and the ware dried and fired. Except for fitting up the segments, it was just as laborious and exacting to apply single decorations, for instance center ornament on plates. In either event, great skill and patience was required to properly apply the transfer.

One object of this invention is to eliminate the need for skilled labor in decorating pottery ware and to substitute therefore automatic procedure and apparatus requiring unskilled labor. Another object of this invention is to place pottery decorating on a mass production basis wherein the decoration as well as the production may be diversified. A further object is to automatically handle and process the ware from the time it is delivered to the decorating conveyor until the dried decorated product is discharged into a receiving device preparatory to firing.

In the drawings:

Fig. 3 is an enlarged vertical section taken substantially on the line 3—3 of Fig. 2, with parts omitted and parts broken away.

Fig. 4 is a vertical section taken on the section line 4—4 of Fig. 2, showing most of the parts of the decoration applying station in elevation with some parts broken away and in section.

Fig. 5 is a side elevation of the apparatus shown in Fig. 2, in the direction of arrow 5.

Fig. 6 is a detail elevation of the side of apparatus of Fig. 2, opposite that of Fig. 5, illustrating the ware-carrier advancing mechanism, with parts omitted and others broken away.

Fig. 7 is another detail elevation of the side of apparatus of Fig. 2, opposite to that of Fig. 5, illustrating the mechanism for intermittently feeding transfer paper through the decoration applying station, with other parts being omitted.

Fig. 8 is an enlarged detail, partly in section, showing the applicator head applying the transfer to the ware.

Fig. 9 is a detail in perspective of the platen and cooperating hold down bars.

Fig. 10 is a horizontal section taken substantially on the line 10—10 of Fig. 4, illustrating the ware holding chucks and means for rotating same, with parts omitted and others broken away.

Fig. 11 is a view of four transfer segments arranged in a flat plane to describe a ring.

Fig. 12 is a view in perspective of the transfer segments arranged edge to edge and describing a conical plane conforming with the verge of a disc-like object.

Fig. 13 is a fragmentary sectional view of a disc-like object having a flat verge.

Fig. 14 shows a center decoration applied to a disc-like article.

Fig. 15 is a diagrammatic illustration showing the size applying apparatus in section and including the operating and supplying means therefor.

Fig. 16 is a view somewhat similar to Fig. 8, but illustrating another form of applicator head with the controlling means therefor.

Fig. 17 is a detail sectional view of another form of the invention for decorating hollow ware, especially concerned with the applicator head and ware support.

Fig. 17 is a sectional view taken on the line 18—18 of Fig. 17.

Fig. 19 is a sectional detail of another form of size applying apparatus.

Fig. 20 is a view showing how the exact shape of an arcuate transfer segment is determined to conform to a conical or sloping verge of a plate.

Fig. 21 is a sectional detail of another form of the applicator head shown in Fig. 16.

Figure 1:
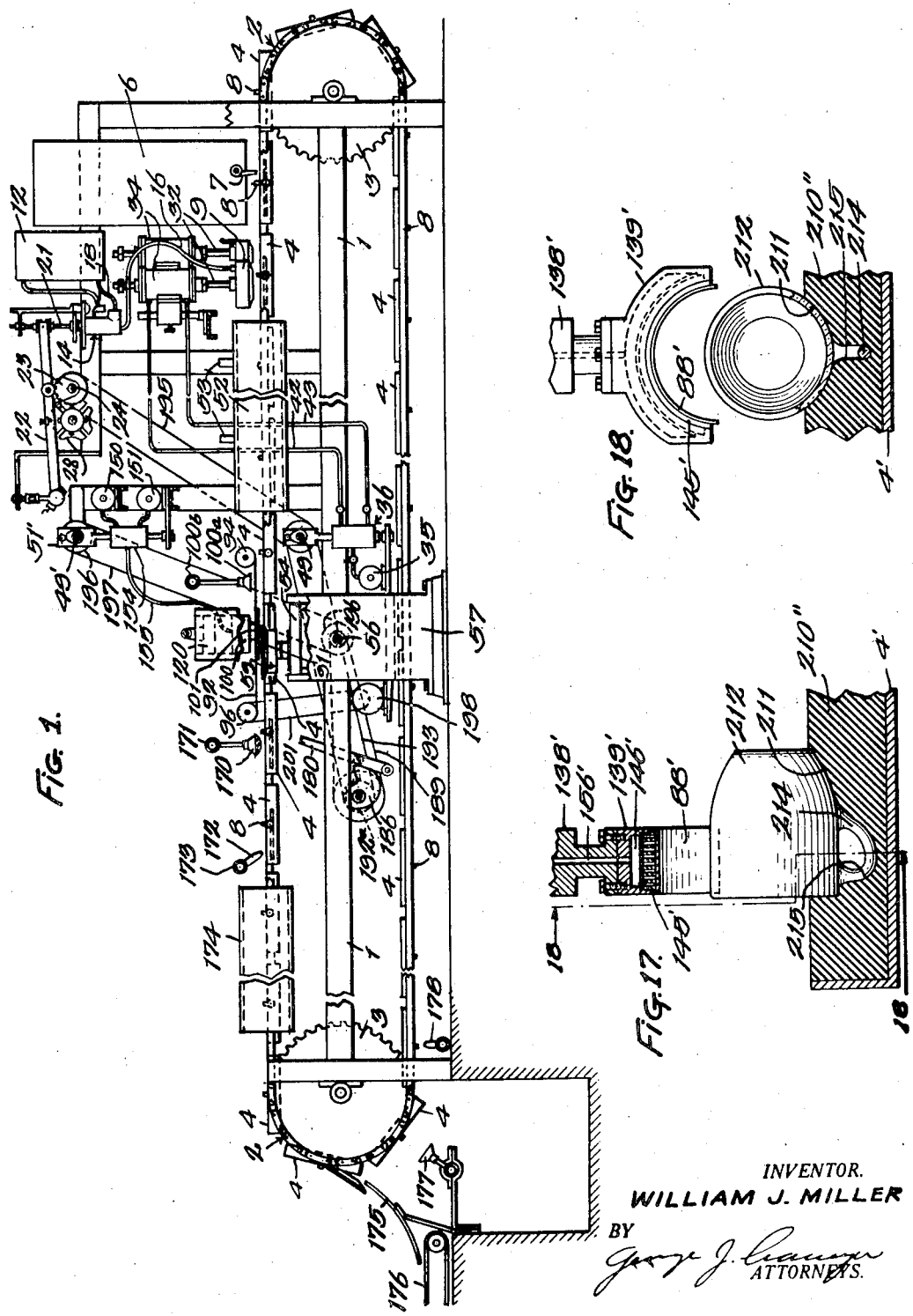
Fig. 1 is an elevation of one form of apparatus for carrying out the invention.

Referring to Fig. 1, the apparatus has an elongated frame 1 with idler sprockets 3 at each end supporting a double strand endless conveyor 2. Connected between the chains and equally spaced therealong are ware carriers 4 in the form of trays having spaced thereacross in staggered relation open-bottomed ware positioning seats 5 adapted to accommodate such disc-like articles as plates and saucers. These seats of each carrier, in the form shown, vary in size and together with those of the other carriers, to provide three lines or zones of production A, B and C capable of handling various sizes of the ware. Obviously all lines may be set up to accommodate the same size ware.

The upper run of the conveyor moves from right to left (see Fig. 1) and, as each tray is advanced into the upper level by the conveyor, it is brought under a ware feed magazine 6 having suitable ware releasing mechanism (not shown) controlled by a lever 7 and actuated or tripped by member 8 on the carrier thereby releasing and depositing a single piece of ware in each seat of a ware carrier 4. Upon the next movement of the conveyor, the ware pieces are brought under a size applicator 9 which is lowered into contact with the plate to apply the size and then raised. Each applicator is in the form of a hollow head having a perforated bottom portion conforming generally to the face of the ware and having a facing 11 Figure 15 of porous resilient material, such as felt, also conforming to the ware face.

The size is supplied to the head 9 as it is raised from a supply tank 12 by way of a force-feed charging and measuring device 14 for determining the proper amount of size to be supplied to the head 9. Generally, the charging device is in the form of a pump having a check valve controlled outlet 15, see Fig. 15, connected with the head 9 through a flexible conduit 16 and having a check valve controlled inlet 17 connected with the bottom of the supply tank through a conduit 18. The felt facing becomes saturated with size and when pressed against the ware leaves a film of size on the surface thereof. The pump replenishes the size absorbed from the chamber by the felt.

The pump 14 is more fully described in my Patent No. 2,046,525 of July 7, 1936, and will only be briefly described herein. It comprises, Fig. 15, an upright cylindrical casing 19 within whose bottom end the outlet 15 and inlet are located. Within the casing 19 operates a piston 20 secured to the bottom end of a piston rod 21, which is reciprocated by having a sliding pivotal connection with the free end of a lever 22 operated in turn by a cam 23 on a continuously rotating shaft 24, for raising and lowering lever 22. The shaft 24 completes one revolution for each movement of the conveyor 2 and is so timed that it will cause the piston to raise and draw into the chamber portion therebelow a given amount of size from the tank 12 as the applicator head 9 is lowered and whereby the piston will be lowered as the head 9 is raised to force the measured quantity of size in the pump chamber into the head 9. To regulate the range of reciprocation of the piston 20 in determining the desired quantity of size to be drawn by the piston into the pump chamber and then fed to the head 9, the lever 22 has an adjustable set screw 26 which limits the downward movement of the lever by engaging one of four adjustable stops or bolts 27 equally spaced about the hub of the four-pointed star wheel 28 of a Geneva motion device.

The star wheel 28 is rotated a quarter turn for every complete revolution of the shaft 24 by a lever 29 on said shaft having a pin 30 operating in one of the radial slots 31 formed in the points of the wheel. When the production in a particular line or lines is non-diversified, then as in the present case, the stops 27 are adjusted uniformly about the axis of the wheel 28. Thus each stroke delivers the same quantity of size. However, if the production is diversified, the stops 27 may be adjusted at different heights from the axis of the wheel 28 in order to regulate the range of reciprocation of the piston 20 and varying quantities of size will be delivered according to the requirements of the various pieces in sequence in the production line.

The size applying head 9 (see Fig. 15), is detachably secured to the lower end of a piston rod 32 having a piston 33 operating within a cylinder 34. Fluid under pressure is alternately supplied to the cylinder 34 at opposite sides of the piston 33 from a suitable source by a pump 35 through the slide valve device 36. The valve 36 includes a valve cylinder 37 having an inlet port 38 connected by a conduit 39 to the outlet of the pump 35 and has a pair of outlets 40 and 41 in its opposite ends connected by conduits 42 and 43 to the opposite ends of the chamber of the cylinder 34. A valve member 44 operates within the valve cylinder 37 with a single port 45 therein alternately establishing communication between the inlet 38 and the outlets 40 and 41 to cause reciprocation of the piston 33. Suitable vent ports 46 and 47 are provided in the valve cylinder 37 and valve member 44 respectively to properly vent opposite end portions of the cylinder 34 during operation.

Generally, the valve member 44 is operated by a cam 48 on a constantly rotating shaft 49 and arranged to alternately engage rollers 50 provided on the sides of the head 51 of the valve member. The head 51 has a longitudinal slot 52 through which the shaft 49 freely extends. A spring 51a is connected to the head 51 and the cylinder housing 37 for an obvious purpose.

If desired, the size may be sprayed onto the surface of the ware by means of a spray gun 9a, see Fig. 19, which may be intermittently operated by such a suitable cam actuated slide valve device as just described.

After the sizing operation, the ware is transported by the trays through a drying chamber or tunnel 52' of sufficient length to provide for curing the size to optimum tackiness. Dry, warm air is circulated through the chamber and is preferably first drawn over heat radiating means, and then blown into the chamber through ducts 53 provided therein, as shown in Fig. 1.

Figure 2:
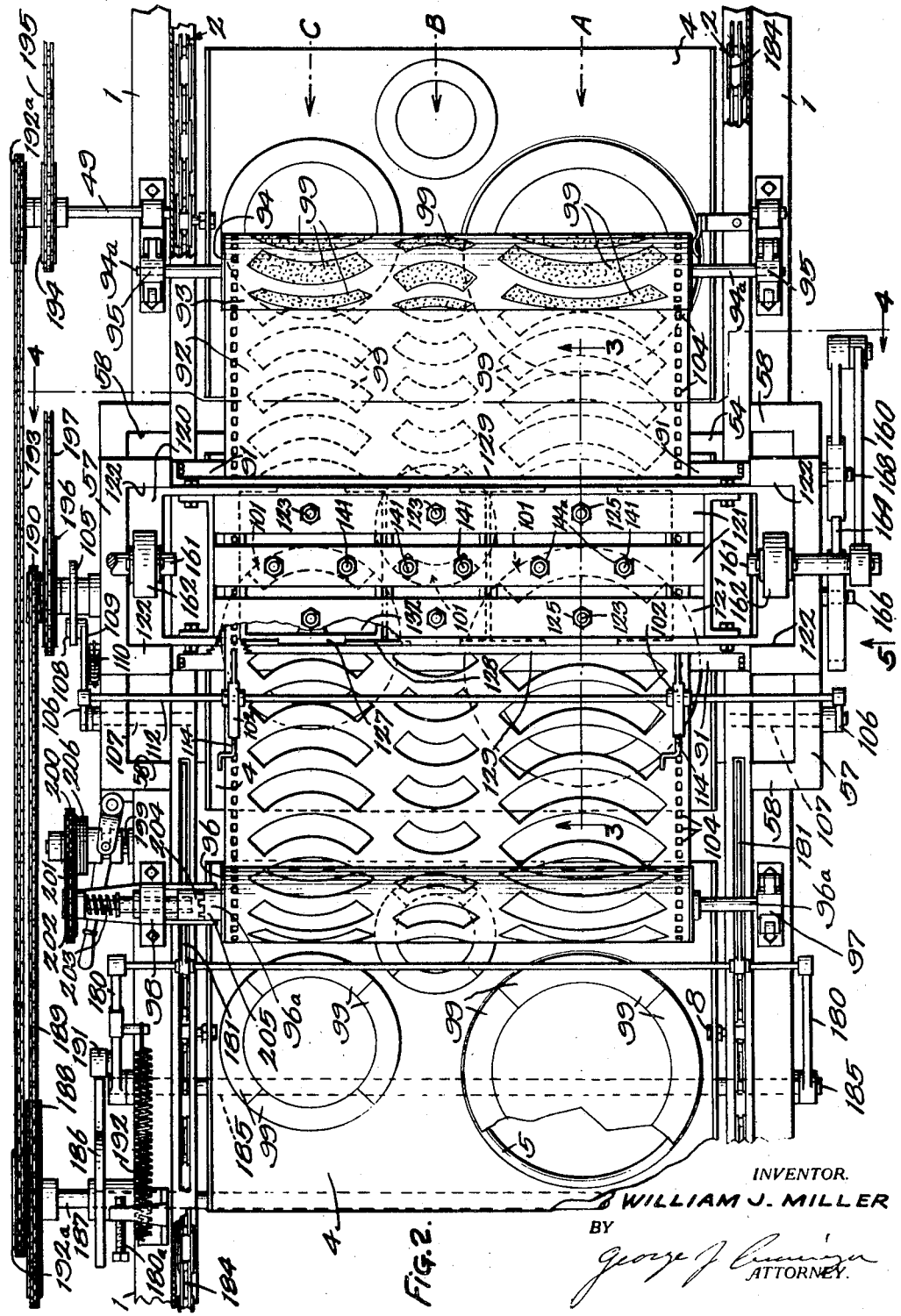
Fig. 2 is an enlarged plan view of the decoration applying apparatus.

Upon leaving the drying chamber, the trays carry the ware to the decorating station where, in the present form of the invention, the face of the verge of the disc-like ware is decorated. To this end, as shown in Figs. 2, 3 and 4, the decorating device includes a lower crosshead 54 which is raised and lowered by spaced cams 55 on a shaft 56 journaled in bearings in frame verticals 57. The crosshead extends between said frame portions 57 and has its ends guided for vertical reciprocation between suitable guide portions 58. Ware supporting chucks 59 are mounted on top of the crosshead, one for each line of production, and arranged across the head in conformity with the seats 5 of the trays 4 so as to register therewith. Each chuck includes a cavitous chuck member 60, Fig. 3, provided with a threaded depending stem 61 threaded into a flanged adjustment bushing 62 removably and rotatably socketed on a hollow supporting pedestal 63 bolted onto the crosshead. Different size chucks may be easily replaced by simply removing one and substituting another. By rotating the bushing 62, the chuck may be adjusted for height. Within the cavity of the chuck member 60 is an annular molded rubber insert or liner 64 whose upper surface 65 is shaped to snugly fit the underside of the rim or verge of the ware. The purpose of the insert is to provide a resilient support for the ware capable of having uniform pressure engagement therewith about the axis thereof, and that will yield slightly if the ware is slightly warped and whereby the ware will be held firmly against displacement or slippage as the chuck is turned during the decorating operation.

Generally, when each tray is brought over the chucks 59, the chucks are raised by the crosshead through the seats of the tray, whereupon the liners 64 of the chucks will engage the ware and lift same off the seats 5. As the ware is engaged by the chucks, a vacuum is created within the closed space 66 that exists between the bottom of the ware and top of the chuck to firmly hold the ware from rotating on the inert. For this purpose, each chuck stem 61 is hollow and communicates with one end of a vacuum passage 67 provided in the crosshead. When the crosshead is raised, the vacuum passage is brought into connection with a vacuum pump 68 by the other end of said passage registering with a port 69 in one of the guide portions 58 of the frame members and connected to the pump by a conduit 70. As the crosshead is finally lowered, the vacuum passage is vented by registering with a vent port 71 formed in said guide portion 58, whereby the ware may be readily released from the chuck and again placed upon its seat on the tray.

During initial downward movement of the chucks, they are rotated a quarter of a turn. This operation is completed four times while the tray is caused to dwell and after each turn of the ware when same is raised, a quarter segment of an annular decorative design is applied to the verge of the ware by the application of decalcomania transfer sections, as will be later described.

For intermittently rotating the chucks, each chuck member 60 has a circumferential row of ratchet teeth 72 engaged by a spring pressed pawl 73, Fig. 10, pivotally mounted on a swinging arm 74 having an enlarged pivot ring 75 oscillatably mounted upon the pedestal 63. All three chucks are simultaneously turned by a reciprocating shifter rod 76 having three links 77 pivotally connected therewith and with the swinging arms 74. Each swinging arm 74 has a series of pivot apertures 78 spaced therealong for adjusting its pivotal connection with its respective link 77, to determine the degree of rotation to be imparted thereby to its respective chuck.

As seen in Fig. 4, the shifter rod is slidably guided in bearings 79 on the crosshead and has one end in sliding pivotal connection with the top end of an oscillatable lever 80. The lever 80 is pivoted to the frame, as at 81, and is moved in one direction by a cam 82 on shaft 56 against the tension of return spring 84. An adjustable stop 86, in the form of a set screw, limits the travel of the shifter bar 76 to enable adjustment of the degree of chuck rotation. After each quarter turn of the chucks, they are held in place by a spring pressed holding dog 85 arranged to engage the ratchet teeth 72 of the chuck. The cam 82 is so formed and rotated that the chucks and ware will receive the desired rotation before the ware is lowered into the seats of the trays during each reciprocation of the crosshead, and whereby four quarter turns will be imparted to the ware intermittently between movements of the conveyor.

Where a single decoration is to be applied in the center of the ware, as shown at 87, Fig. 14, rotation of the ware may be dispensed with. Also, if the ware has a flat verge, as shown at 88 in Fig. 13, rotation of the ware may or may not be dispensed with, as a number of transfer segments or a single one may be employed to form a decoration on such a verge.

As illustrated, the decoration applying apparatus is arranged to cut the transfers from a parent roll of transfer designs and apply them progressively onto disc-like objects, or plates, having a conical or inwardly sloping verge 90 (see Fig. 3) to ornament the verge, such as shown at 89 in Fig. 14. To this end, as shown in Figs. 2, 3 and 4, spaced above the chucks and supported between the side frame members 57 is a cutter plate 91 upon which is supported an intermittently advanced elongated length of transfer paper 92. The paper 92 is fed from a supply roll 93 thereof wound upon a reel 94 whose shaft 94a is detachably supported in bearings 95 on the side frames 1. After passing over the cutter plate, the transfer paper is wound upon a reel 96 whose shaft 96a is detachably supported in bearings 97 and 98 of the frames 1.

Printed on the underside of the transfer paper are three longitudinal rows of quarter transfer segments 99 of decorative designs formed, respectively, in accordance with the various sizes of plates held by the chucks. The transfer segments of the middle row are curved oppositely to those of the outer rows to reduce the size of the sheet 92, economize on paper and to enable compactness of the cutting mechanism, as will be apparent later.

After each movement of the transfer paper, a transverse row of transfer segments will be brought into registry over the verges of the plates held by the chucks, respectively. When so positioned, each transfer segment is cut from the sheet by a hollow, vertically reciprocating cutter head 100 cooperating with the cutter plate 91 and then applied to the verges of the plates by a vertically reciprocating applying plunger head 101 operating within the cutter head, as more fully described later.

Just prior to being advanced under the cutting and applying heads, the transfer paper may, if desired, be moistened to increase its deformability and/or loosen the pigment from the paper. This is accomplished by providing one or more water spraying nozzles 100a over the sheet adjacent the supply reel 94, connected with a water supply conduit 100b, as shown in Fig. 1.

The transfer paper is intermittently advanced in accordance with the spacing of the transfer segments by reciprocating pawls 102 having a multiple of ratchet-like teeth 103, engaging a multiple of marginal perforations 104 of the paper, so as to distribute the pull and avoid tearing the paper between the perforations. As seen in Fig. 7, the pawls 102 are actuated by a cam 105 through levers 106 mounted on a shaft 107 and oscillated by the cam engaging a roller 108 at the end of a bellcrank lever extension 109 of one of the levers. The lever extension 109 is resiliently held in engagement with the cam 105 by a suitable tension spring 110.

To regulate the amount of intermittent movement of the transfer paper, each pawl has an adjustable lost motion connection with its respective lever 106. For this purpose, each pawl has an elongated slot 111 within which is received a pivot rod 112 on the free ends of the levers. To regulate the range of movement of the rod 112 in the slot of each pawl, in order to effect the desired lost motion, a stop in the form of a screw 114 is threaded into the end of the pawl and extended into the slot. The toothed head is enlarged so as to be resiliently held in contact with the transfer paper by gravity.

In regard to cutting out transfers; it will be understood that this invention comprehends the application of border decoration as well as center decoration to flat ware. There are various forms of border decoration, for instance, the decoration may be continuous as a circle or a band or it may be a group of interlocked designs extending around 360° of the border. Again, said border decoration may consist of individual figures spaced from one another and the spacing may be small or it may be large.

I prefer to cut out the transfers in vertical registry with the place on the article where it is to be received. Furthermore, I prefer to apply the transfer immediately it is cut out to the article by an axially moving implement. The invention comprehends the application of a decoration in its entirety at one and the same time and it also comprehends the application of a complete decoration in segments.

Each transfer, whether a segment of a larger design, or the design in its entirety, is positioned over the ware where it registers over a slot or opening 115 in the plate 91. From the foregoing discussion, it will be clear that the shape of the opening will be determined by such factors as the segmental or whole character of the decoration. For instance, where a border decoration is being applied to a plate as illustrated in Fig. 14, the slot or opening is arcuate in shape and said opening approximates a quarter section of the verge which indicates that the border decoration is of the continuous variety such as a band or circle or the like. Should the decoration be made up of individual figures separated by white space, then the length of the slot or opening 115 might be less than the quarter section shown. If a center decoration such as that shown in the center of the plate of Fig. 14 is being applied in its entirety to an article, then the opening might be circular. Moreover, if the verge of the plate is of polygonal shape, then the opening would approximate a parallelogram. Thus, it will be seen that there are many shapes and sizes of opening which may be utilized and I am not to be limited to the exact shapes shown.

In the present showing where the border of the ware is being decorated, the opening is preferably slightly larger than the transfer segments to be cut thereby to permit employment of a face on the applying head 101 covering the outermost margins of the decoration and allow clearance for the cutter head 100 to move between the margin of the opening and the applying head 101. By providing full coverage for the applicator head, the size never comes in contact with it and therefore the head remains dry and clean at all times.

In order to hold the transfer paper, or sheet 92, taut while the transfer segments are being cut, a pair of spaced hold down bars 117 and 118 are provided, Fig. 9, which are arranged over the opposite curved cutting edge portions of the openings 115 of the cutter plate and contoured in accordance therewith. The hold down bars have a resilient facing 119 Figure 9, of felt or the like and are lowered onto the transfer sheet and firmly hold same down on the cutter plate during the cutting operation, as shown in Fig. 3. They are raised off the sheet after the cutting and applying operation, prior to each advancement of the transfer sheet.

To support and actuate the hold down bars 117 and 118, the cutter head 100 and the applying head 101, a crosshead 120 is provided. It comprises a rectangular frame within which is secured three spaced parallel bars 121, the frame being raised and lowered between guides 122 of the frame members 57. The cutter heads 100 are suspended from the outer bars 121 of the crosshead 120 by means of upright bolts 123 on the cutter head freely extending through bearing openings 124 in the bars, with a nut 125 on the top end of each bolt to engage the bar in raising the cutter head upon raising of the crosshead. The cutter head is limited for downward movement by having depending adjustable stops 126, in the form of bolts, which engage the cutter plate 91 in the lowered position of the cutter head. The opposite sides of each cutter head 100 has guide portions 127 working within guideways 128 in cross pieces 129 extending between the side frame members 57.

Each cutter head comprises a hollow cutting die part 130 formed to cooperate with its respective opening 115 in the cutter plate 91 in cutting the segments from the transfer sheet, when the head is lowered, with the cutting edge 131 of the die inclined from one corner of the die to the opposite one to produce a shearing cut, as shown in Fig. 3. The cutter die 130 is detachably secured to an upper portion 132 of the cutter head by a flange 133 secured to an inner flange of the upper head portion 132 by the bolts 126. The cutter head is spring pressed from the supporting bars 121 by compression springs 134 encompassing bolts 123 and being interposed between the bars and an adjusting nut 135 on the bolts. Thus, the crosshead 120 may continue downward after the cutter head has reached its lowered position, with the springs being so tensioned to cause the cutter die to cut the transfer sheet. The hold down bars 117 and 118 are suspended from the flange 133 of the cutter die by upright bolts 135a on said bars being received in apertures 136 in the flange. On said bolts 135a are compression springs 137 which are interposed between the die flange and the hold down bars to spring press the bars down upon the transfer sheet as the cutter head is lowered.

The transfer applying head 101 comprises an upper guide portion 138 in the form of an arcuate block shaped in accordance with the cutter die, being guided for reciprocation within the upper part 132 of the cutter head and upon the bottom of which is detachably secured the applicator part 139 by means of bolts 140. The applying head is carried by the central bar 121 of the crosshead 120 by having a pair of upright bolts 141 extended freely through openings 142 in the bar. The applicator heads are so arranged that after the transfer segments have been cut by the cutter heads 100, the applicator heads continue downward with the crosshead 120 and incident to such movement, grasp or pick up the cut transfers and resiliently press them onto the verges of the plates (see Fig. 3), effected by tension springs 143 surrounding each bolt 141 and interposed between the applicator head thereof and the bar 121. To regulate the pressure of the applicator part 139 against the verge of a plate, the tension of the springs 143 on the bolts 141 carrying same may be regulated by an adjusting nut 144 on each bolt arranged to engage the bottom end of the spring. Also, the dwell period of the applicator on the transfer may be regulated by adjusting a nut 144a provided on the top end of the bolt 141.

As seen in Fig. 8, the applicator part 139 is provided with a bottom facing of permeable resilient material 145 in the form of a rubber pad fitted into the cavity 146 or othewise secured to said part, and provided with very small perforations 147. A perforated metal backing 148 is provided for the pad and is fitted within a shoulder 149 in the cavity 146 of the applicator.

The bottom face of the applicator pad 145 is contoured generally to the shape of that portion of sloping verge of the plate to be operated upon, with the exception that it is slightly convexed relative thereto, to first contact the central portion of the transfer with the ware surface, then progressively apply it to the brim to expel all air therebetween, as shown in Fig. 8.

As the applying head 101 is lowered, sub-atmosphere or vacuum is established in the cavity 146 of the applicator part 139 to be effective through the perforations of the pad 145 to cause the transfer segment engaged thereby to adhere thereto, and, as the applicator is raised after having applied the transfer, same is released therefrom by dissipating the vacuum in the head or blowing air under pressure through the cavity of the applicator part.

To accomplish this result, as shown in Fig. 8, a vacuum pump 150 and an air pressure pump 151 are employed whose service ports are alternately connected with the cavity 146 of the applicator part 139 through the intermediation of a slide valve device 154. The slide valve device 154 is similar to the valve device 36 (Fig. 15) with like parts or elements being designated by like numerals having prime exponents. Therefore, the port 38' of the valve device 154 connects with the cavity 146 of the applicator part by a flexible conduit 155 leading therefrom into connection with a passage 156 in the applicator head which opens into said cavity. In this device, the ports 40' and 41' connect with the service ports of the vacuum pump 150 and pressure pump 151 by conduits 157 and 158, respectively. A throttle valve 159 may be interposed in each conduit 157 and 158 to regulate the amount of vacuum or pressure to be established in the cavity 146 of the applicator part. In the valve device 154, there is only one vent port 47' in the valve casing 37' to vent the space below the valve member 44' which is extended to maintain the port 41' closed when connecting the vacuum pump with the applicator part.

The crosshead 120 carrying the cutting and applying heads is reciprocated by having an adjustable linkage connection with the lower crosshead 54. Said linkage includes a link 160 whose top end is pivotally connected, as at 161, with an upstanding boss 162 on the crosshead 120, and having its lower end pivotally connected, as at 163, with one end of a rocker arm 164 provided with a slot 165 in its other end to form a sliding pivotal connection with a pin 166 extended from the crosshead 54 through a vertical slot 167 in one of the side frames 57. The rocker arm 164 has a number of pivot apertures 167a spaced therealong for providing an adjustable pivotal connection with a stud 168 in regulating the amount or range of reciprocation of the crosshead 120, as desired.

Thus, it will be seen that upon each cycle of operation of the crossheads 54 and 120, the plates on a tray will be lifted off the seats thereof, a segment applied to its verge, and then rotated by the chucks a quarter of a turn as they are lowered again into their seats. As this operation is repeated four times while the tray dwells at this station, four such segments will have been applied to the plates to form an annular decoration thereon, with the transfer segments being arranged edge to edge or equally spaced as the case may be, on the verge of the plate and fitting the surface described thereby, which approximates a portion of a cone, as shown in Fig. 12.

After the transfers have been applied to the plates, the tray carrying same is advanced under one or more water spray nozzles 170, connected with a water supply line 171, where water is sprayed onto the transfer segments to loosen the paper backing thereof. Upon the next movement of the tray, the plates are brought under one or more nozzles 172 connected with a pressure line 173, where a jet of fluid such as air under pressure steam, etc., is directed over the paper backing of the transfers at an angle to blow them off the plates. The tray is then advanced through a drying tunnel or chamber 174 for the purpose of evaporating any water remaining on the surface of the plates and for thoroughly drying the freshly applied decoration. As the tray is advanced out of the drying tunnel, they are inverted as they pass around the sprocket 3 at the leaving end of the conveyor, whereupon the plates on the tray will slide out of their tray seats and be deflected onto a chute 175 which directs them into a conveyor 176. The ware is now in readiness for the decorating kiln. After the plates are discharged from each tray, the tray is advanced over a water spray nozzle or nozzles 177 where the trays are washed and any paper pieces remaining thereon washed off. The trays are then advanced onto the lower stretch of the conveyor where they are brought over a series of nozzles 178 which direct a jet of hot or warm air thereover to thoroughly dry them.

Where the verge of a plate is flat as at 88 in Fig. 13, a circular transfer, for instance a disc, may if desired be cut in one piece and the whole applied to the ware in one operation. If applied in the form of a ring, the ring would be the same size as the verge of the plate. That is to say the outer circumference of the ring and the inner circumference thereof would be the same as the verge. Obviously, the diameter of the ring may not be exactly equal to the diameter of the verge and it may be of greater or lesser width depending upon the width of the circle of decoration. Whether divided into segments, the transfer would normally be cut to fit a surface describing a ring or a portion thereof lying in a flat plane.

In the case of disc shaped ware having an inwardly sloping verge, the transfer ring or ring segment is cut to fit a conic surface. Since the transfer is cut from a sheet lying in a flat plane, the correct shape of segment must first be determined before the decoration is printed on the sheet. This factor is also taken into consideration in fashioning the shape of the cutter slot, the cutter and the decalcomania applicator. Thus, after determining the inner and outer radius of the cone and the angle of its slope, a ring segment which would fit the cone is laid out on a flat surface, as shown in Fig. 20. It will be noted that when laid out in a flat plane, a complete circle or ring is not formed, see Fig. 20, therefore the remaining portion of the segment must be divided into sections of equal size, in the present instance, four, in order to fit the verge of the plate, see Fig. 12. The shape and size of a cutter head, the cutter and the cutter slot will depend to some extent upon the result of these calculations.

Fig. 11 illustrates how four different decorative designs of different size can be applied to the verge of a disc-like article. The transfers, due to the size and location of the decoration, may be arranged in non-abutting relation but they may all be applied with the same implement.

The means for advancing the conveyor and for driving the various devices of the machine in timed relation will now be described. To this end, the shaft 56 may be considered as the main drive shaft coupled to a suitable prime mover, or motor, not shown.

As seen in Fig. 6, the conveyor 2 is intermittently advanced in accordance with the spacing of the trays thereon by an oscillating lever 180 whose top end is provided with a pawl 181 having a hooked end 182 adapted for engagement between the bearings 183 of the links of the chains 184 of the conveyor to advance same in one direction of movement of the lever. The lever is fulcrumed as at 185 and is oscillated by a cam 186 on a shaft 187 which is driven by the drive shaft 56 by having a sprocket wheel 188 thereon connected by a chain 189 with a sprocket wheel 190 on the shaft 56. The wheel 188 is four times the size of the wheel 190 to cause the lever 180 to advance the conveyor once for four cycles of operation of the shaft 56 and applying apparatus controlled thereby. On the lever 180 is a roller 191 for engaging the cam 186 and is resiliently held in engagement therewith by a tension spring 192 connected between the lever and the frame. A screw 180a adjustably limits the stroke of lever 180 and consequently the tray.

The shaft 49 operating the valve device 36 is driven in uniform timed relation with and by the cam shaft 187 by means of similar sprocket wheels 192a on said shafts and sprocket chain 193.

The shaft 24 controlling the operation of the charging head 14 is driven by the shaft 49 by means of similar sprockets 194 on said shafts connected by a sprocket chain 195. The shaft 49' controlling the operation of the valve 154 for the vacuum and pressure system of the applicator head is driven by the drive shaft 56, with similar sprocket wheels 196 on said shafts connected by a sprocket chain 197.

As seen in Figs. 2 and 5, take-up reel 96 for the transfer sheet may be driven by a combination motor and adjustable speed reducer 198 on whose drive shaft 199 is a sprocket wheel 200 connected by a sprocket chain 201 with a sprocket wheel 202 on a shaft 203 supported in the bearing 98. The shaft 203 is detachably connected with the take-up reel to drive same, by having thereon a spring pressed clutch member 204 connecting with a correlatively formed clutch member 205 on the end of the reel shaft 96a. A suitable friction clutch 206 may be employed on the speed reducer drive shaft 199 to frictionally connect the sprocket wheel 200 therewith. The clutch 205 is preferably set to take up all the slack in the sheet when first starting to wind and as the roll of used paper increases in diameter, the clutch will slip whilst holding the paper taut.

The invention also contemplates progressively establishing suction in the perforations of the pad 145 of the applicator head from those of the inner to the outer edges thereof, as the head is lowered to engage a cut transfer segment. In doing this, the transfer segment will correspondingly progressively engage the face of the pad from the inner edge to its outer edge, whereby wrinkling of the segment will be prevented. This is especially advantageous where the pad face is formed to apply a transfer to the verge of a plate that slopes considerably as shown in Fig. 16. As shown in Fig. 16 in this form, the applicator part 139 is provided with a multiple of chambers 208 and 209 spaced apart over the pad 145 by a partition 210, with each chamber being alternately connected with a vacuum pump 150 and pressure pump 151 by a valve 154. In this form, however, the cams 48' of the valves 154 would be so set on the shaft 49' at different positions as to cause vacuum to be established in the chambers 208 and 209 progressively.

In the form shown in Fig. 21, there is a central chamber 208' and a multiple of outer chambers 209' spaced along the length of the pad 145' by partitions 210' with the central and outer chambers connected through separate valves 154' to a source of vacuum and pressure. It is preferred to operate this applicator in such fashion as to first secure the central portion of the cutout to the head and then progressively secure the outer portions, thus allowing the outer portions to move laterally and be secured in readjusted position inherent in applying a flat segment to a cone shaped out of a level surface.

The invention also contemplates adapting the method and apparatus just described in similarly decorating the sides of hollow ware such as cups or the like, as shown in Figs. 17 and 18, with parts characteristic of parts of the structure previously described being designated by like numerals having prime exponents. In this form, the trays 4' would be provided with a resilient ware positioning member 210" having a suitable positioning pocket 211 formed to receive and hold a handled cup 212 in reclining position with the handle 214 of the cup positioned in a depression 215 in the pocket to predetermined decoration position. In this form, the applicator part 139' is formed arcuately in conformity with the sides of the cup, and is adapted when lowered to pick up an elongated transfer segment 88' after being cut, and apply same to the cup.

Having thus described my invention, what I claim is:

1. In an organized machine for decorating pottery ware, and the like, apparatus for feeding ware, size applying apparatus, means for conditioning the size preparatory to the application of decalcomania to the ware, decalcomania transfer cutting and applying apparatus and ware conveying means having ware seats adapted to receive ware from the feeding apparatus and to transfer the ware to and through sizing, size conditioning and decorating positions as represented by the apparatus named in predetermined mutual relationship, the ware being discharged from the conveying means subsequent to decorating.

2. In an organized machine for decorating pottery ware and the like, apparatus for feeding ware, size applying apparatus, means for treating the size preparatory to the application of decalcomania to the ware, decalcomania cutting and applying apparatus, means for washing transfer paper from the ware and a conveyor having a plurality of ware seats on which ware of diverse description is carried from the feeder to sizing, decorating and washing positions as represented by the apparatus named, the ware being automatically discharged from the conveyor after the paper has been washed therefrom.

3. In the manufacture of pottery ware, the method of decorating the ware which comprises feeding the ware along a line of production, sizing the ware at a given station, conditioning the size, positioning the ware in registration with a decalcomania transfer above and to be severed, punching out the transfer in registration with the portion of the ware to be decorated and applying the transfer from this position directly to the ware, washing the transfer paper from the ware and then removing the decorated ware from said line of production.

4. In the manufacture of decorated pottery ware, the method which comprises moving the ware along a line of production; sizing that portion of the ware to be decorated at a given station and at another station punching out a decalcomania transfer from a connected series thereof above and in registration with the place on the article where said decalcomania is to be applied and from this position applying same to the ware, removing the transfer paper from the ware and thereafter firing the ware.

5. The combination with means for sizing pottery ware and means for washing the paper backing from decalcomania transfers after they have been applied thereto of conveying means arranged to transport the ware along a path wherein decalcomania transfers are applied thereto, means arranged adjacent the path of travel of the ware automatically operable to apply transfers to the ware and means for producing relative rotation between the ware and the applying means in order to register different zones of the ware surface with the applying means.

6. The combination with means for sizing pottery ware and means for washing the paper backing from decalcomania transfers after they have been applied thereto of conveying means arranged to transport the ware along a path wherein decalcomania transfers are applied thereto, a strip of uncut decalcomania transfers above the ware and mechanism arranged above the strip, automatically operable to hold down the strip, cut out transfers therefrom and apply them to the ware.

7. The combination with means for sizing pottery ware and means for washing the paper backing from decalcomania transfers after they have been applied to the ware of conveying means arranged to transport ware along a path wherein decalcomania transfers are applied to the ware, a roll of decalcomania transfers arranged above the path of travel of the ware, mechanism automatically operable to cut several transfers from the strip at once and apply them to several pieces of ware.

8. In apparatus for applying decalcomania to pottery ware and the like, conveying means arranged to transport the ware along a path wherein the ware is sized and decalcomania transfers applied thereto, means arranged above the path of travel of the ware operable to size the ware and cut out transfers and apply them to the ware and means for synchronizing the operation of the last named means with the operation of the conveying means.

9. In apparatus for applying decalcomania to pottery ware and the like, conveying means arranged to transport the ware along a path wherein the ware is sized and decalcomania transfers applied thereto, mechanism arranged above the path of travel of the ware, operable to size and apply decalcomania transfers to the ware, means operable to remove the paper backing from the decalcomania after the decalcomania has been applied to the ware and means for initiating the operation of said sizing and decalcomania applying mechanism when the ware is brought into register therewith by said conveying means and means for synchronizing the operation of the mechanism with the operation of the conveying means.

10. In apparatus for applying decalcomania to pottery ware and the like, intermittently movable conveying means arranged to transport the ware along a path wherein the ware is sized and decalcomania transfers applied thereto, means arranged above the path of travel of the ware operable to size the ware and apply decalcomania transfers to sized ware between movements of the conveyor, means for washing off the transfer paper after the decalcomania has adhered to the ware and means for initiating the operation of said sizing and decalcomania applying mechanism when the ware is brought into register therewith by said conveying means.

11. In apparatus for applying decalcomania to pottery ware and the like, intermittently movable conveying means arranged to transport the ware along a path wherein the ware is sized and decalcomania transfers applied thereto, a feeder for loading the ware on to the conveyor, means arranged above the path of travel of the ware, operable to size the ware and to apply transfers to the sized ware between movements of the conveyor, means for washing off the transfer paper from the ware after the decalcomania has become affixed to the ware and means for initiating the operation of said sizing and decalcomania applying mechanism when the ware is brought into register therewith by said conveying means.

12. In apparatus for applying decalcomania to pottery ware and the like, intermittently movable conveying means arranged to transport the ware along a path wherein the ware receives decalcomania decoration, means operable to feed pieces of ware in succession to the conveying means, mechanism arranged above the path of travel of the ware operable to cut transfers and apply them to the ware and means for receiving decorated ware from the conveying means and carrying it away.

13. The combination with a conveyor provided with spaced recesses for receiving ware to be decorated of means for moving said conveyor to index said recesses from station to station, a plurality of ware supports below said conveyor, means for sizing ware, at one of said stations, means for applying decalcomania transfers to said ware at another of said stations, and means for relatively moving the ware supports and said applying means when recesses are in register therewith to effect a decoration applying operation on said ware.

14. The combination with a conveyor provided with spaced recesses for receiving ware to be decorated of means for moving said conveyor to index said recesses from station to station, a ware support below said conveyor, means for sizing the ware at one of said stations, means for applying decalcomania transfers to said ware at another of said stations, means for washing the paper backing from said transfer at another station, and means for relatively moving the ware support and the applying means when a recess is in register therewith to effect a decoration applying operation on said ware.

15. The combination with a conveyor provided with spaced recesses for receiving ware to be decorated of means for moving said conveyor to index said recesses from station to station, a rotatable ware support below said conveyor, means for sizing the ware at one of said stations, means for applying decalcomania to said ware at another of said stations and means for lifting and moving said ware support relative to said applying means when a recess is in register therewith.

16. The combination with a conveyor provided with spaced recesses for receiving ware to be decorated of means for moving said conveyor to index said recesses from station to station, a rotatable ware support below said conveyor, means for sizing the ware at one of said stations, means for cutting out and applying decalcomania transfers to said ware at another of said stations and means for moving said last named means to effect a decoration applying operation when a recess is in register therewith and with said ware support.

17. The combination with a conveyor provided with spaced recesses for receiving ware to be decorated of means for moving said conveyor to index said recesses from station to station, size applying means at another of said stations including means for indexing decalcomania transfers with ware therebelow, a ware lifter below said decoration applying means and means operable to relatively move said decoration applying means and lifter when a recess is in register therewith to effect a decoration applying operation.

18. The combination with a conveyor provided with spaced recesses for receiving ware to be decorated of means for moving said conveyor to index said recesses from station to station, size applying means at one of said stations, ware washing means at another of said stations, and decoration applying means at another of said stations including means for indexing decalcomania transfers with ware therebelow and means for applying said transfers to the ware, and means for relatively moving the decoration applying means and the ware to effect a decoration applying operation when a recess is in register with said decoration applying means.

19. In apparatus for decorating disc-shaped fired pottery ware and the like, means for conveying the ware in several parallel rows to a decorating position, a plurality of decalcomania transfer cutters arranged above the ware, a sheet of transfer bearing material arranged to be cut by the cutters and having the decalcomania decorations arranged thereon in parallel rows, each row being intended for a given line of ware, an applicator associated with each cutter and means for synchronously actuating the cutter, conveying means and applicators so as to decorate several pieces of ware simultaneously and the ware in each row in successive order.

WILLIAM J. MILLER.

REFERENCES CITED

The following references are of record in the file of this patent:

UNITED STATES PATENTS

| Number | Name | Date |
|---|---|---|
| 1,414,856 | Bogaty et al. | May 2, 1922 |
| 2,072,875 | Gray | Mar. 9, 1937 |
| 2,166,268 | Simmons | July 18, 1939 |
| 2,305,553 | Orswell | Dec. 15, 1942 |